United States Patent Office 3,481,740
Patented Dec. 2, 1969

3,481,740
EMULSION DEVELOPERS FOR
LITHOGRAPHIC PLATES
Clifford E. Herrick, Jr., Los Gatos, Calif., and Ho Chien
Hwang, Newton Centre, Mass., assignors to Summer
Williams, Inc., Boston, Mass., a corporation of
Massachusetts
No Drawing. Continuation of application Ser. No.
341,400, Jan. 30, 1964. This application Mar. 29,
1967, Ser. No. 626,904
Int. Cl. G03c 1/60
U.S. Cl. 96—91
4 Claims

ABSTRACT OF THE DISCLOSURE

A diazo resin printing plate is developed using a two phase emulsion. The aqueous phase is composed of a protective colloid and a normally liquid aliphatic polyhydroxy compound such as ethylene glycol. The resin phase is composed of a vinyl chloride-vinyl acetate copolymer, an epoxy-type resin such as epoxy-Novolac resin, a pigment and an organic plasticizer.

This is a continuation of application Ser. No. 341,400, filed Jan. 30, 1964, now abandoned. This invention relates to aluminum lithographic plates having a photosensitive layer comprising diazo resins. It relates particularly to developing of such plates after exposure to a negative original. More particularly it relates to a novel resin emulsion developer for coating the original image with a substance having intrinsically better resistance to wear.

Efforts have been made in the past to provide resinous image surfaces. Thus Hall, U.S. Patent 2,754,279, describes a resin emulsion developer comprising an oil and water emulsion of an unmodified hydroxyl-containing resinous glycidyl polyether of a dihydric phenol. However, this patent requires that the plate after exposure be first wiped with water containing a small amount of gum arabic to dissolve and remove unexposed and unreacted diazo layer. When the resin emulsion is then applied skill is required in order to avoid image distortion. Further the resin image which binds to the exposed portions of the diazo layer has a degree of water sensitivity which interferes with ink-receptiveness.

Hodgins and Leonard, U.S. Patent 2,865,873 describes a vinyl chloride-vinyl acetate copolymer emulsion which is directly applied to the exposed plate. However, the emulsions of this patent show affinity for non-image areas as well as image areas yielding bridging of ½ tone dots and uncontrollable "piling" leading to plates of inadequate wear resistance.

One object of this invention is to provide a directly applicable emulsion developer for diazo plates which provides an inherently ink-receptive resinous image.

A further object is to provide such a developer which can be work over a plate for a long period without the difficulties of redissolving, piling or bridging.

Still another object of this invention is to provide a resin emulsion developer of uniform and easy application and improved storage stability.

Another object of this invention is to provide such an emulsion which will yield images of improved durability and toughness.

Yet another object of this invention is to provide an emulsion which can be used with diazo images on unsilicated aluminum surfaces.

Other objects and advantages of this invention will be apparent from the description which follows and the claims appended thereto.

The resin emulsion developer of this invention comprises from 1 to 5 parts by weight of an aqueous phase to one part resin phase. The aqueous phase comprises a normally liquid aliphatic polyhydroxy compound and a protective colloid. The resin phase comprises 5 to 30% by weight of a mixture of an epoxy type resin and copolymer of vinyl chloride and vinyl acetate, a pigment dispersed in a solvent-soluble organic liquid and an organic plasticizer.

The liquid polyhydroxy compound comprises at least 5% by weight of the total emulsion. The resin mixture comprises in parts by weight/100, 5 to 100 of a copolymer of vinyl acetate and vinyl chloride and 0 to 95 of an epoxy-type resin. The term "copolymer" is also intended to include those incorporating small amounts of a third polymerizable monomer, such as maleic acid. The term "epoxy type resin" is intended to include both resinous glycidyl polyethers (wherein the skeleton of the molecular chain has oxygen bridges) and epoxy-modified phenol-aldehyde resins (wherein there are epoxy side groups on the phenolic hydroxy), which are known as "epoxy-Novolac" resins. Although not essential to the invention, it is desirable to mix into the emulsion, preferably with the aqueous phase, finely divided pigment which is insoluble in either water or the solvent in order to achieve the maximum effect in preventing bridging or piling. Generally, such pigment may be used in amounts up to 50% by weight of the resin phase.

Copolymers of vinyl chloride and vinyl acetate give excellent results in the absence of any epoxy type resin. However, such copolymers are often quite sticky and are hard to remove from the hands of the operator using the emulsion. When epoxy-type resin is partially substituted, as indicated above, the resulting resin is much less sticky and easy to remove.

Among the commercially available resins useful in this invention are the following:

Dow Chemical Company, Midland, Mich.
 (1) Epoxy Novolac resin D.E.N. 438 semi-solid, viscosity 30,000 to 90,000 cps. at 125° F., molecular weight—650.
 (2) Liquid epoxy resins 331, 332 or 334 viscosities 11,000–16,000, 6400, and 500–700 cps. respectively.
 (3) Solid epoxy resins 661, 664, 667
Shell Chemical Co., New York, N.Y.
 (4) Solid epoxy resins 828, 834, 1004
Union Carbide Plastics Co., New York, N.Y.
 (5) Copolymer of 91% vinyl chloride and vinyl acetate, partially hydrolyzed (Bakelite VAGH).
 (6) Copolymer of 87% vinyl chloride and 13% vinyl acetate (Bakelite VYHH)
 (7) Tripolymer of 86% vinyl chloride, 13% vinyl acetate and 1(one)% maleic acid (Bakelite VMCH)

Other ingredients may be incorporated into the emulsion, although they are not essential to the practice of this invention. Thus, a preservative such as phenol or an acid such as phosphoric acid may be incorporated into the aqueous phase. Also, a wetting agent, preferably non-ionic, may be incorporated into the resin phase. Further, a small proportion of an ink may be added if desired to the emulsion.

Although a wide choice of ingredients may be used for the various elements of the emulsion of this invention, we have found that certain ingredients give better end results than others. Thus, the preferred epoxy type resin is that commonly known as "epoxy-Novolac." The preferred class of pigments are organic pigments dispersed in an organic ester such as dioctyl-phthalate. The organic plasticizer is preferably a low molecular weight polyester resin. The insoluble pigment used is preferably a high surface area silica pigment. The solvent to be used in the resin phase is preferably relatively non-toxic without any excessive offensive odor; is relatively insoluble in water and has a boiling point high enough to permit adequate working time for the emulsion on large plates and low enough to provide a reasonably short setting time for the image. A solvent boiling point range of 110–180° C. is preferred. Solvents which are useful in this invention include cyclohexanone, diisobutyl ketone, methylisobutyl ketone and ethyl butyl ketone. Among the plasticizers which have been found suitable are the phthalates, such as dioctyl, dimethyl, dibutyl dephenyl and butyl-benzyl. In addition, triphenyl phosphate, alkyl-aryl phosphates and p-toluene sulphonamide and various nitrogen derivatives thereof can be used. Other suitable plasticizers include glycolates such as butylphthalyl, butylglycolate, in addition to low molecular weight polyester resins.

As regards the protective colloid, the amount used should be such so as not to provide too high a viscosity in the aqueous phase. Useful colloids include gum arabic, cellulose gum, polyvinyl pyrollidone, mesquite gum, guar gum, karaya gum, methyl cellulose, and polyvinyl alcohol.

With respect to the normally liquid aliphatic polyhydric alcohol, those that are useful with this invention include but are not limited to: ethylene glycol; glycerol; tri-ethylene, trimethylene glycol, and dipropylene glycols; propane diols; butane diols; and 2,2'oxydiethanol.

Mold-preventing preservatives that can be used include phenol, sodium benzoate, citric acid, sodium nitrate, tartaric acid, tannic acid and formaldehyde.

The following examples are specific embodiments of the invention. All proportions and percentages are in terms of weight.

EXAMPLE 1

A basic resin phase and a basic aqueous phase having the following compositions were prepared and set aside.

| Aqueous Phase: | Percent |
| --- | --- |
| Distilled water | 44.9 |
| Ethylene glycol | 41.2 |
| Phenol | 0.05 |
| Phosphoric acid | 2.10 |
| Gum arabic | 11.70 |
| Resin Phase: | |
| Cyclohexanone | 56.8 |
| Dow DEN 438 | 15.8 |
| Bakelite VAGH | 3.2 |
| Tween No. 60 | 1.9 |
| Span No. 60 | 0.2 |
| Flexol R2H | 3.2 |
| Heliogen Blue flushed pigment #56-5234 | 18.9 |

Tween 60 is a wetting agent manufactured and sold by the Atlas Powder Company, Wilmington, Delaware and represented by the manufacturer as a polyoxyethylene sorbitan monostearate. Span 60 is manufactured and sold by the same company and stated to be a sorbitan monostearate.

Flexol R2H is sold by Union Carbide Plastics Co., 30 E. 42nd St., New York, N.Y. and represented (Bulletin F–6136–P) as a polyester resin plasticizer.

Heliogen Blue LED 56–5234 is a blue flushed pigment manufactured and sold by General Aniline & Film Corporation through its Collway Pigments Division, 435 Hudson St., New York, N.Y. and stated to be a 32% phthalocyanine blue pigment in dioctylphthalate.

The ingredients of the aqueous phase were blended in the order given under conditions of high agitation. The resin phase was prepared under similar conditions. Three and 7/10 parts by weight of basic aqueous phase were mixed with 0.3 part by weight of Hi-Sil 233. Hi-Sil 233 is a white pigment manufactured and sold by Columbia-Southern Chemical Corp., a subsidiary of Pittsburgh Plate Glass Company, 1 Gateway Center, Pittsburgh, Pa., and represented (Hi-Sil Bulletin #4, reissued April 1960) as silica pigment having a particle size about 0.022 micron and an $SiO_2$ content of about 87%. After about fifteen minutes of vigorous mixing one part by weight of the above resin phase was added slowly to the Hi-Sil-containing aqueous phase. A considerable increase in viscosity attended the dispersion of the resin phase into the aqueous phase, the final viscosity was about 800 cps. This emulsion was designated as No. 30.

An aluminum metal surface which has been prepared by graining the surface by air-fluidised aluminum oxide, washing, silicating in hot 5% sodium silicate, washing and drying was sensitized with a 2% aqueous solution of a diazo polymer prepared according to the direction given on page 7 of U.S. Patent 2,714,066. The sensitized plate was exposed under a negative and processed with the emulsion developer of this example in the following way:

A liberal quantity of developer was poured into a covered tray. A cellulose sponge was pressed several times into the pool of the developer in the tray so that the lower part of the sponge became thoroughly saturated with developer. The exposed plate was placed on a dry table and rubbed over repeatedly with a developer-soaked sponge; an immediate build-up color in the exposed portions of the plate was observed. After about thirty seconds of rubbing color build-up was intense and exhaustion of the developer was observed. At this point the plate was removed to a sink and flooded with a water spray so that excess developer was removed. The plate was then squeezed free of water, removed to a gumming table and gummed. During the gumming operation it was noted that the image areas repelled the 5° Be' gum arabic used to protect the non-printing areas prior to mounting on the offset press.

The plates were then stored for six weeks under ambient humidity and temperatures varying between 50 and 75° F. The plates were then press tested and found to pick up a full load of ink in four revolutions of the printing cylinder. They were spotless and had an entirely clean background. Similar plates tested on a web-offset press yielded runs of approximately 250,000 impressions. Further, the emulsion was not effected by five cycles of exposure to 0° F. for 16 hours followed by warming for 24 hours.

EXAMPLE II

Grained metal plates were prepared as follows: Type 3003 medium temper aluminum was degreased using Oakite No. 30, a proprietary aluminum cleaner-etcher manufactured and sold by Oakite Products Inc., 19 Rector St., New York, using a spray-type washing machine with a contact time of about 15 seconds at a temperature of 170°, rinsed with spray of water and dried with radiant heat. Following the degreasing step, the cleaned aluminum was grained using air-fluidized $Al_2O_3$ abrasive, degreased and washed in a ½ oz./gallon solution of Oakite No. 30 at a temperature of 140° F. with a contact time of 4 seconds, washed with plain water and dried with infra-red heat. Following the washing operation, the plates were immersed in a tank of Oakite 34 solution at 70° F. for 1 minute, rinsed and dried with infra-red heat. Oakite No. 34 is proprietary "de-smutting" composition manufactured and sold by Oakite Products Inc., 19 Rector St., New York. These plates were sensitized with a 2% diazo polymer solution prepared according to the directions given on page 7 of U.S. Patent 2,714,066 and thoroughly dried with warm air. A portion of the sensitized plates were force-aged for 16 hours at a temperature of 160° F. under wet and dry package conditions. Following exposure beneath a negative original, the plates were processed by first applying an acidic gum arabic solution to the whole surface followed by application of a black emulsion developer of the composition given below which had been prepared according to the procedure of Example I.

Aqueous phase: Percent
- Ethylene glycol _____ 43.4
- Distilled water _____ 37.5
- Phenol _____ 0.07
- Phosphoric acid _____ 2.9
- Gum arabic _____ 16.3

Resin phase: Percent
- Cyclohexanone _____ 44.2
- Dow Epoxy No. 438 _____ 18.4
- VAGH _____ 3.7
- Tween No. 60 _____ 2.2
- Span No. 60 _____ 0.2
- Flexol $R_2H$ _____ 3.7
- GAF flush orange (GRD-29-3034) _____ 16.6
- GAF flush blue (56-5234) _____ 10.2
- GAF flush yellow (GD-12-3034) _____ 0.9

Proportions: G.
- Aqueous phase _____ 300.0
- Santocel-C _____ 12.0
- Resin phase _____ 100.0

3 (Aqueous Phase): 0.12 white pigment): 1.0 (Resin Phase)

Santocel-C is an extremely high (110–150 m. 2/g.) surface area 89% silica pigment manufactured by the Monsanto Chemical Company, St. Louis, Mo. Comparison of the plate which has been force-aged with the plate preserved under ambient (70° F.) temperatures showed very little deterioration had occurred in the aged sample, all of the plates being suited for high qualtiy printing work. It should be noted that the prior art states that a barrier layer—preferably a silicated barrier layer—is necessary in order to achieve a stable diazo layer which is in direct contact with aluminum metal. On a direct in-plant comparison with grained plate manufactured as outlined above but which had been given an additional step at 200° F. which produced a silicated layer as described in U.S. Patent 2,714,066, it was found that the unsilicated plate processed with the emulsion of this sample ran from ⅔ to ¾ as long as the silcated plate so that contrary to the prior art teachings, no great advantage results from the silication treatment either in shelf life or press image life. It should further be noted that the emulsion of this example requires no additional step to produce ink-receptivity at the press, our image being reliably ink-receptive. All of the advantages cited for the emulsion of Example I apply with equal force to the emulsion of this example. We have also made plates omitting the Oakite 34 step, producing, thereby, plates which on processing with the emulsion of this example yielded plates showing good length of run and excellent running characteristics.

EXAMPLE III

An emulsion of the following composition was prepared using the procedure of Exampe I.

Aqueous phase: Percent
- Ethylene glycol _____ 21.40
- Distilled $H_2O$ _____ 63.30
- Phenol _____ 0.06
- Phosphoric acid _____ 2.30
- Gum arabic _____ 13.00

Resin phase:
- Cyclohexanone _____ 44.2
- Dow Epoxy No. 438 _____ 18.4
- VAGH _____ 3.7
- Tween No. 60 _____ 2.2
- Span No. 60 _____ 0.2
- Flexol $R_2H$ _____ 3.7
- Flush orange (GRD-29-3-34) _____ 16.6
- Flush blue (56-5234) _____ 10.2
- Flush yellow (GD-12-3034) _____ 0'9

Proportions: G.
- Aqueous phase _____ 300.0
- Hi-Sil 233 _____ 45.0
- Resin phase _____ 109.0

2.75 (aqueous phase): 0.413 (white pigment): 1.0 (resin phase)

This emulsion produced a black image in place of the blue of Example I, but was otherwise similar in characteristics. The various tests and comparisons outlined in Example I were also carried out on the emulsion of this example with similar results and conclusions. The flushed pigments employed are General Aniline and Film Corporation products.

EXAMPLE IV

An emulsion of the following composition was prepared using the procedures of Example I.

Aqueous phase: Weight
- Ethylene glycol _____ 32.1
- Water _____ 44.9
- Phenol _____ 0.1
- Phosphoric acid, 85% _____ 3.4
- Gum arabic _____ 19.5

Resin phase:
- Cyclohexanone _____ 56.8
- Dow Epoxy No. 438 _____ 15.8
- VAGH _____ 3.2
- Tween No. 60 _____ 1.9
- Span No. 60 _____ 0.2
- Flexol R2H _____ 3.2
- GAF 56-5234 heliogen blue _____ 18.9

This emulsion produced a blue image like that of Example I. The various tests and comparisons outlined under Example II were also carried out with the emulsion of this example with similar results and conclusions.

EXAMPLE V

An emulsion of the following composition was prepared.

Aqueous phase: Percent composition
- Ethylene glycol _____ 38.1
- Distilled water _____ 46.7
- Phenol _____ 0.1
- Phosphoric acid _____ 2.3
- Gum arabic _____ 13.0

Resin phase:
- Cyclohexanone _____ 49.9
- Dow Epoxy No. 438 _____ 12.2
- VAGH _____ 2.4
- Tween No. 60 _____ 1.5
- Span No. 60 _____ 1.5
- Flexol $R_2H$ _____ 2.4
- Flush orange (GRD-29-3034) _____ 10.9
- Flush blue (56-5234) _____ 6.8
- Flush yellow (GD-12-3034) _____ 0.6
- G.P.I. Rediset Black NC1950 _____ 13.1

Proportions: G.
- Aqueous phase _____ 300.00
- Hi-Sil 233 _____ 40.0
- Resin phase _____ 109.0

2.75 (aqueous phase): 0.38 (white pigment): 1.0 (resin phase)

This composition yielded an emulsion especially free of any "pour area" tendency and, like all other compositions discussed herein, was grease-receptive per se. The printing ink employed is a product of the General Printing Ink, Division of the Sun Chemical Corporation, 730 3rd Avenue, New York 17, N.Y.

The tests and comparisons outlined in Example I were repeated with this emulsion with similar results and conclusions.

EXAMPLE VI

An emulsion of the following composition was prepared.

| Aqueous phase: | Percent composition |
|---|---|
| Ethylene glycol | 45.0 |
| Water (distilled) | 45.0 |
| PVP–K30 | 10.0 |
| Resin phase: | |
| Cyclohexanone | 69.9 |
| VAGH | 6.8 |
| Tween No. 60 | 1.6 |
| Span No. 60 | 0.8 |
| Heliogen blue (56–5234) | 21.7 |

| Proportions: | G. |
|---|---|
| Aqueous phase | 471.0 |
| Resin phase | 270.0 |

1.71 (aqueous phase): 1.00 (resin phase)

It will be noticed that this emulsion contains no white pigment, employs solely a vinyl resin, and employs a polyvinylpyrrolidone polymer as a protective colloid in the emulsion. This emulsion is recommended for use in applications where especially difficult press conditions are encountered and/or long press runs are required. The image is ink-receptive per se. Suitably applied, bridging and piling are absent.

What is claimed is:

1. A process for developing a printing plate having a light-sensitive diazo resin layer, comprising treating the exposed plate with an emulsion which comprises one to five parts by weight of an aqueous phase per one part of a resin phase; said aqueous phase comprising a protective colloid and a normally liquid aliphatic polyhydroxy compound in an amount equal to at least 5% by weight of the total emulsion; said resin phase comprising dispersed in solvent 5% to 30% by weight of a mixture of 5 to 100 parts of a copolymer of vinyl chloride and vinyl acetate and 0 to 95 parts of an epoxy-type resin per 100 parts of mixture, a dispersion of pigment in solvent-soluble organic liquid and an organic plasticizer.

2. A printing plate having a light-sensitive diazo resin layer, said layer being exposed to light and treated in accordance with the process of claim 1.

3. A process for developing a printing plate having a light-sensitive diazo resin layer comprising treating the exposed plate with an emulsion which comprises one to five parts by weight of an aqueous phase per one part of a resin phase; said aqueous phase comprising a protective colloid and ethylene glycol in an amount equal to at least 5% by weight of the total emulsion; said resin phase comprising dispersed in solvent 5% to 30% by weight of a mixture comprising 5 to 100 parts of a copolymer of vinyl chloride and vinyl acetate and 0 to 95 parts of an epoxy-Novolac resin per 100 parts of mixture, a dispersion of organic pigment in a solvent-soluble liquid organic ester and an organic plasticizer.

4. A printing plate having a light-sensitive diazo resin layer, said layer being exposed to light and treated in accordance with the process of claim 3.

References Cited

UNITED STATES PATENTS

| 3,396,019 | 8/1968 | Uhlig | 96—33 |
| 3,155,513 | 11/1964 | Sorensen | 96—91 |
| 2,754,279 | 7/1956 | Hall | 260—29.2 |

GEORGE F. LESMES, Primary Examiner

M. B. WITTENBERG, Assistant Examiner

U.S. Cl. X.R.

96—49; 260—29.6, 29.2